United States Patent [19]

Cheng et al.

[11] 4,229,309
[45] Oct. 21, 1980

[54] MAGNESIUM-CONTAINING DISPERSIONS

[75] Inventors: William J. Cheng; David B. Guthrie, both of St. Louis, Mo.

[73] Assignee: Petrolite Corporation, St. Louis, Mo.

[21] Appl. No.: 816,626

[22] Filed: Jul. 18, 1977

[51] Int. Cl.$^2$ .................... C10M 1/10; C10M 3/02; C10L 1/12; C01B 13/14
[52] U.S. Cl. ................................. 252/25; 44/51; 44/66; 44/76; 44/DIG. 3; 252/18; 252/33; 252/39; 252/42.7; 252/389 R; 423/432; 423/636; 424/172; 424/365; 428/321; 428/489
[58] Field of Search ............... 252/18, 42.7, 25, 33, 252/39, 389 R; 423/636, 432; 44/51, 66, 76, DIG. 3

[56] References Cited

U.S. PATENT DOCUMENTS

| | | | |
|---|---|---|---|
| 2,485,861 | 10/1949 | Campbell et al. | 252/18 |
| 2,641,531 | 6/1953 | Austin et al. | 423/636 |
| 2,641,532 | 6/1953 | Hicks | 423/636 |
| 3,055,829 | 9/1962 | Wiley et al. | 252/18 |
| 3,150,089 | 9/1964 | Hunt | 252/18 |
| 3,689,218 | 9/1972 | Kelly | 423/636 |

Primary Examiner—Delbert E. Gantz
Assistant Examiner—Irving Vaughn
Attorney, Agent, or Firm—Sidney B. Ring; Hyman F. Glass

[57] ABSTRACT

This invention relates to stable, fluid magnesium-containing dispersions and the preparations thereof by the high temperature dehydration of $Mg(OH)_2$ to $MgO$ in a dispersant-containing fluid.

20 Claims, No Drawings

MAGNESIUM-CONTAINING DISPERSIONS

Dispersions of magnesium-containing compounds have been heretofore prepared by various methods. One such method, which involves the reaction of Mg metal with an alcohol to form an intermediate magnesium alkoxide, is a complicated multi-stepped process. The following are illustrative:

U.S. Pat. Nos.
   2,570,058
   2,582,254
   2,593,314
   2,692,239
   2,788,325
   2,834,662
   2,895,913
   2,939,808
   3,018,172
   3,150,089
Belgian Pat Nos.
   842,131
   818,960

Ulric B. Bray, Charles R. Dickey and Vanderveer Voorhees Ind. Eng. Chem., Prod. Res. Dev., 14, 295-8 (1975).

Other processes employing already formed MgO, although not considered suitable by Bray, Dickey and Voorhees (loc. cit.), are illustrated by the following:

U.S. Pat. Nos.
   3,018,172
   3,524,814
   3,629,109
   3,865,737
   3,928,216
Belgian Pat. No. 817,035
Netherlands Application No. 6,410,242

We have now discovered a facile method of preparing stable, fluid magnesium-containing dispersions which comprise heating $Mg(OH)_2$ above its dehydration temperature in the presence of a fluid of low volatility containing a dispersing agent soluble in said fluid.

The process, in essence, comprises an almost "explosive" dehydration of magnesium hydroxide to magnesia according to the equation $$Mg(OH)_2 \rightarrow MgO + H_2O.$$

During this dehydration, $Mg(OH)_2$ is disintegrated into minute particles of MgO which are immediately suspended and become stabilized in the fluid by the presence of a dispersing agent.

Any suitable magnesium compound capable of being subdivided upon dehydration into submicron particles of magnesia can be employed. $Mg(OH)_2$ is the preferred starting magnesium compound whether starting as the anhydrous solid, or aqueous slurry, or as a milk of magnesia formed in situ. Added water, however, is not an essential part of the process except as noted in example 10 where $Mg(OH)_2$ is formed in situ by the reaction of $H_2O$ with a magnesium alkoxide.

Any suitable non-volatile process fluid capable of being heated to the dehydration temperature of $Mg(OH)_2$ can be employed. The process fluid should be relatively stable and relatively non-volatile at the dehydration temperature. However, any volatility encountered is readily controlled by refluxing and condensing apparatus.

Examples of such non-volatile process fluids are as follows: hydrocarbons (such as mineral oil, paraffin oil, or aromatic oil), diphenyl oxide fluids, silicone oils, polyglycol ethers or vegetable oils, etc., solely the dispersant, or any combinations thereof.

The non-volatile process fluid should contain a dispersant(s) capable of retaining the magnesium compound formed by dehydration in stable suspension. Any suitable dispersant which is relatively stable under the dehydrating conditions of this invention can be employed.

These are illustrated by the following: saturated and unsaturated fatty acids (such as stearic acid and oleic acid) and derivatives thereof (such as sorbitan monooleate), sulfonic acids (such as mahogany or petroleum derived sulfonic acids and synthetic sulfonic acids), naphthenic acids, oxyalkylated fatty amines, alkylphenols, sulfurized alkylphenols, oxyalkylated alkylphenols, etc.

The reaction is carried out as follows. Since the dehydration temperature of $Mg(OH)_2$ is about 350° C. (662° F.), the reactant mixture is heated at about this temperature. The water of dehydration is removed from the reaction by its volatility. In practice, temperatures of about 250° C. to 430° C. or higher are employed, such as from about 290° C. to 400° C., but preferably from about 310° C. to 380° C.

The particle size of the resulting MgO so formed in general should be of a size which is stable and fluid. In practice, the particle size is no greater than about 5 microns, such as no greater than about 2 microns, but preferably no greater than about one micron.

The concentration of the magnesium compound so formed in the non-volatile process fluid should be no greater than that concentration which maintains suitable fluidity. In general, the final concentration based on non-volatile fluid and other materials is from about 1% to 32% when calculated as percent magnesium, such as from about 2% to 29%, for example, from about 3% to 26%, but preferably from about 4% to 23%.

The concentration of the dispersant in the non-volatile process fluid should be sufficient to maintain a fluid, stable dispersion of magnesium oxide in the fluid. In general the weight concentrations of dispersant and non-volatile fluid may range from 100% dispersant and 0% non-volatile fluid to as little as 0.01% dispersant and 99.99% fluid, such as from about 95% and 5%, for example from about 90% to 10%, but preferably from about 85 to 15%.

Although we do not wish to be bound by actual theory, we believe that the formation of dispersible magnesium oxide results from the in situ formation of highly porous an sub-micron sized MgO at the instant $H_2O$ is liberated from $Mg(OH)_2$ at its dehydration temperature. In such a form the resulting MgO is immediately dispersed and stabilized by the action of the dispersing agent. Prior art procedures do not prepare MgO dispersions by employing the high temperature range which is necessary for the product and process of this invention, and therefore, do not achieve a stable dispersible magnesium oxide but instead attempt to achieve magnesium dispersibility through other forms of magnesium compounds, particularly as carbonate. However, the prior art procedures are more complicated, more difficult to carry out, and less energy-efficient.

One high temperature process described in U.S. Pat. No. 3,055,829 involves the conversion of metal carboxylates to the metal carbonates.

In this invention the preferable dispersing agent is an organic carboxylic acid or sulfonic acid or any mixture thereof which reacts with the magnesium compound to form a salt or other complex. The magnesium salt or complex or such acid moiety is formed by the reaction of an equivalent of basic magnesium moiety (such as, for example, magnesium oxide, magnesium hydroxide, magnesium carbonate, or any mixtures thereof) with a corresponding equivalent of acid moiety.

The following examples are presented for purposes of illustration and not of limitation.

EXAMPLE 1

To a 500-ml glass reactor fitted with agitator and thermometer were charged 150 g high boiling hydrocarbon oil, and 50 g sorbitan mono-oleate. With the stirrer on, 29.2 g $Mg(OH)_2$ was added through a powder funnel. The contents of the reactor were heated to 270° C. When all the water was off, the fluid reaction product was centrifuged to remove any large particles present. The stable fluid dispersion resulting contained dispersed magnesium oxide calculated at about 4.0% as magnesium.

EXAMPLE 2

To the reactor of Example 1 were charged 100 g high boiling hydrocarbon oil, 8.2 g sorbitan mono-oleate, 15.7 g dodecylbenzenesulfonic acid, and 29.2 g $Mg(OH)_2$. The mixture was heated at 320° C. When all the water was removed, the product was a stable viscous dispersion containing dispersed magnesium oxide calculated at 8.5% Mg.

EXAMPLE 3

To the reaction of Example 1 were charged 335 g of a mixture comprised of about 150 g high boiling hydrocarbon oil, 50 g sorbitan mono-oleate, 9.8 g naphthenic acid, 25.8 g dodecyl benzenesulfonic acid, 59.5 g $Mg(OH)_2$ and 40 g $H_2O$ to simulate the use of a commercial slurry of $Mg(OH)_2$. The contents were heated to 322° C. When all the water had been removed, a sample of the product was centrifuged. The analysis of the resulting fluid layer indicated the dispersed magnesium oxide content to be 8.0% as magnesium.

EXAMPLE 4

To the reactor of Example 1 were added 150 g of a virtually non-volatile process oil and 50 g sorbitan mono-oleate. To effect a dispersion 64.5 g tap water and 29.2 g $Mg(OH)_2$ were added slowly. The contents were heated gradually to 358° C. When all the water had been removed, the resulting fluid product was centrifuged. The compositions of the stable fluid layer contains dispersed magnesium oxide, calculated at 6% as magnesium.

EXAMPLE 5

To the reactor of Example 1 were charged 150 g of a virtually non-volatile process oil, 56.4 g oleic acid, 14.1 g recovered $Mg(OH)_2$ and MgO. The contents were heated to 385° C. The mass was cooled and 30 g $Mg(OH)_2$ were added. The contents were heated to 390° C. When all the water had been removed, the resulting fluid product was milky in appearance and remained a stable milk even after centrifugation for ten hours. The dispersed magnesium oxide content of the fluid layer was calculated at 8% as magnesium.

EXAMPLE 6

To the reactor of Example 1 were charged 32.0 g dodecylbenzenesulfonic acid, 28.2 g oleic acid, 150 g of a virtually non-volatile process oil, and 46.6 g $Mg(OH)_2$. The contents were heated to 385° C. When all the water was removed, the product was fluid and bright. The dispersed magnesium oxide content was calculated at 8% as magnesium.

EXAMPLE 7

To the reactor of Example 1 were charged 32.0 g dodecylbenzenesulfonic acid, 28.2 g naphthenic acids, 150 g of a virtually non-volatile process oil, and 46.8 g $Mg(OH)_2$. The reaction mass was heated to 375° C. After all of the water had been removed, the fluid product was bright and clear. The dispersed magnesium oxide content was calculated at 8.7% as magnesium.

EXAMPLE 8

To the reactor of Example 1 were charged 150 g of a virtually non-volatile process oil, 56.4 g naphthenic acids, and 46.8 g $Mg(OH)_2$. The reaction mass was heated to 390° C. at which temperature there was no more water coming off. The fluid product contained stable dispersed magnesium oxide calculated at 9.0% as magnesium. The product was filtered through a 5 micron filter and no solid was retained by the filter.

EXAMPLE 9

To the reactor of Example 1 were charged 28.2 g naphthenic acids, 75 g of a virtually non-volatile process oil, and a water slurry of milk of magnesia (containing 0.4 mole as magnesium hydroxide as made by the reaction of NaOH and $MgCl_2$). The reactants were heated to 350° C. After all the water had been removed, the resulting product was filtered through a 5 micron filter. The fluid filtrate was stable and bright. The dispersed magnesium oxide content was calculated at 9.7% as magnesium.

EXAMPLE 10

To the glass reactor of Example 1 were charged 28.2 g naphthenic acids, 15.7 g dodecylbenzenesulfonic acid, 75 g high boiling hydrocarbon oil, and 18 g water. To the reaction mass with stirring was added magnesium alkoxide containing ½ atom of magnesium so as to form ½ mole of magnesium hydroxide in situ. The mass was heated to 375° C. After all of the organic volatiles from the alkoxide and water from the dehydration of $Mg(OH)_2$ formed in situ had been removed, the fluid product contained dispersed magnesium oxide calculated at 8.7% as magnesium.

EXAMPLE 11

To the reactor of Example 1 were charged 150 g U.S.P. mineral oil, 56.4 g U.S.P. oleic acid, and 46.6 g reagent grade magnesium hydroxide. The reactants were heated to 360° C. After all of the water had been removed, the reaction mass was centrifuged to remove the traces of insolubles present. The resulting fluid layer which was a dispersion of magnesium oxide in a solution of magnesium oleate in mineral oil had a magnesium content of 8.1%.

EXAMPLE 12

This example illustrates the removal of some of the high boiling process oil to form a more concentrated dispersion. To a 1-liter reactor were charged 390 g high boiling process oil, 149 g naphthenic acids, and 244.5 g magnesium hydroxide. The reactants were stirred and heated to 360° C. until no more water was liberated. During this time some of the process solvent also distilled. The weight of stable, fluid, clear, bright product was 536 g of magnesium oxide dispersion calculated at 19% as magnesium.

The MgO dispersions of this invention can be further reacted to form dispersions of the corresponding derivatives. For example, after dehydration is accord with this invention, the MgO dispersions can be further reacted with $CO_2$ to form $MgCO_3$ dispersions, reacted with $H_2O$ to form $Mg(OH)_2$ dispersions, etc.

The compositions of this invention have a wide variety of uses. The following are illustrative:

1. As a combination anti-corrosion and acidic neutralization additive for lubricating oils and greases.
2. As a combination anti-corrosion and acidic neutralization additive during the combustion of fuels such as residual fuel, pulverized sulfur-containing coal, or mixtures thereof.
3. As a combination anti-weathering and sealing agent for water-proofing cement, concrete, and asphaltic surfaces.
4. In proprietary pharmaceutical and cosmetic formulations.
5. As corrosion inhibitors, particularly in fuels containing vanadium.

USE AS CORROSION INHIBITOR FOR VANADIUM-CONTAINING FUELS

The demand for greatly increased amounts of energy has forced utilities and other large-quantity users of fossil fuels to explore low-quality fuels for use in steam boilers and gas turbines. Fuels such as unrefined crude oil and residual oil contain large amounts of impurities which result in corrosive deposits in the equipment. Two of these impurities, sodium and vanadium, form catastrophically corrosive, low melting slags that can destroy a vital part in a matter of hours.

Crude oil usually contains 1-500 ppm of vanadium in the form of a porphyrin complex depending on the source. Because of its origin as a concentrate from the refining process, residual oil contains several times more vanadium than the crude from which it was derived. The combustion of these vanadium-containing fuels produces very corrosive $V_2O_5$ deposits which can destroy a turbine part in a matter of hours. Although the vanadium can be removed, the cost of the process cancels the economic advantage of using unrefined fuels. Vanadic corrosion is, therefore, usually controlled with chemical additives and optimization of operating conditions.

Sodium is almost always present in low-quality fuels, either directly in the crude oil or indirectly through contamination from various sources. The technology for removing sodium is well developed. These are limiting processes, however, and a trace of sodium must always be dealt with. For example, in maritime use the sodium level can be increased because of the introduction of sodium chloride through the air intake and contamination of the fuel by sea water. During combustion, the sodium reacts with the sulfur in the fuel to form the sulfate which is deposited in turbine parts. This reaction has been shown to be thermodynamically favored and results in the only sodium compound that will deposit under these conditions.

The mechanism of corrosion by vanadium and sodium has received much attention. Nascent oxygen species has been proposed as the corrosive active aggent in $V_2O_5$ melts. Various mechanisms have been presented to explain corrosivve attack by sodium sulfate at metal surfaces. The classical method of inhibiting the corrosive characteristics of $V_2O_5$ and $Na_2SO_4$ melts has been to form high-melting vanadates of the former and minimize the level of the latter. Magnesium has been the most successful for this type of protection. The optimum levels of magnesium addition are not precisely known. Just as the mechanism of corrosion is only partially understood, so too is that of its inhibition.

There are other methods of limiting the corrosion such as reducing the operating temperature and maintaining the air to fuel ratio so that slightly reducing conditions exist during combustion. These types of methods may not be applicable. For example, the air to fuel ratio cannot be lowered to obtain reducing conditions in a gas turbine. Lower operating temperatures make the system less efficient and may be ruled out for economic reasons. Thus, chemical additives are often the best way to inhibit corrosion.

The compositions of this invention inhibit fireside corrosion in gas turbines, steam boilers and furnaces when incorporated into petroleum fuels in minor but effective amounts such as from about 1 to 2000 ppm, for example from 1 to 1000 ppm, but preferably from about 1 to 100 ppm, based on magnesium content.

USE AS ADDITIVES FOR AUTOMOTIVE AND INDUSTRIAL LUBRICANTS

A chemical additive in the usual sense refers to a material which enhances a desirable property while eliminating or minimizing one or more undesirable ones. Since about 1930 the commercial application of chemical additives to lubricating oils has kept pace with the increasing demands of modern machinery, such as automotive engines, high-speed machinery, high-pressure hydraulic control systems, etc. The literature and patent art are replete with examples of such additives which in general improve the lubrication performance for the machinery while minimizing the frequency of maintenance.

For combating the severe rust conditions which may be encountered during shipping of machinery or in long storage or exposure to out-door weather, sodium and calcium sulfonate additives are commonly used.

Additives for imparting detergency to lubricating oils are widely used at 2-20% concentration and are found to prevent or remove deposits of oil-insoluble sludge, varnish, carbon and lead compounds which otherwise form on internal combustion engine parts. The additives probably act by adsorbing and suspending the insoluble particles so that deposits are minimized, and cleanliness of rings, valves, and cylinder walls are maintained. Commercial detergent additive for such automotive and diesel engine oils are designed also to react chemically with the highly acidic by-products of combustion that find their way into the lubricating oil system. The additives with this type of functionality are usually comprised of basic barium, calcium, and magnesium salts of oil-soluble organic compounds.

A discussion of the preparation and use of overbased or hyperbasic detergent sulfonates is found in U.S. Pat. No. 3,057,896. The term "metal ratio," as used to describe the amount of overbasing or hyperbasic detergency in the additive, is defined as the ratio of equivalents of metal to equivalents of organic acid. The important metals which readily provide such overbasing are those of the alkaline earth group particularly magnesium, calcium, and barium.

The products of this invention at a metal ratio of about 15–16/1 such as the product described in Example 12 can be employed as hyperbasic additives for lubricating oils.

We claim:

1. A process of preparing a stable, fluid magnesium oxidecontaining dispersion which consists essentially of heating a composition comprising a non-volatile process fluid containing $Mg(OH)_2$ and a dispersant to the dehydration temperature of $Mg(OH)_2$ until all the water has been removed, said non-volatile process fluid being capable of being heated to the dehydration temperature of $Mg(OH)_2$, and said dispersant being capable of retaining the magnesium compound formed by dehydration in stable suspension.

2. The process of claim 1 where the dehydration temperature is greater than about 250° C.

3. The process of claim 2 where the MgO dispersion is converted to a dispersion of another magnesium derivative selected from the group consisting of $MgCO_3$ and $Mg(OH)_2$.

4. The process of claim 3 where MgO is reacted with $CO_2$ to form a stable, fluid dispersion of $MgCO_3$.

5. The process of claim 3 where MgO is hydrated with $H_2O$ to form a stable, viscous fluid suspension of $Mg(OH)_2$.

6. The product of claim 1.
7. The product of claim 2.
8. The product of claim 3.
9. The product of claim 4.
10. The product of claim 5.

11. A vanadium-containing fuel containing a minor but effective amount of the product of claim 6 to inhibit the corrosive effect of the vanadium-containing fuel.

12. A vanadium-containing fuel containing a minor but effective amount of the product of claim 7 to inhibit the corrosive effect of the vanadium-containing fuel.

13. A vanadium-containing fuel containing a minor but effective amount of the product of claim 8 to inhibit the corrosive effect of the vanadium-containing fuel.

14. A vanadium-containing fuel containing a minor but effective amount of the product of claim 9 to inhibit the corrosive effect of the vanadium-containing fuel.

15. A vanadium-containing fuel containing a minor but effective amount of the product of claim 10 to inhibit the corrosive effect of the vanadium-containing fuel.

16. A lub oil or grease containing a minor amount of the product of claim 6 sufficient to act as an anti-corrosion and acidic neutralization additive for said lube oil or grease.

17. A lube oil or grease containing a minor amount of the product of claim 7 sufficient to act as an anti-corrosion and acidic neutralization additive for said lube oil or grease.

18. A lube oil or grease containing a minor amount of the product of claim 8 sufficient to act as an anti-corrosion and acidic neutralization additive for said lube oil or grease.

19. A lube oil or grease containing a minor amount of the product of claim 9 sufficient to act as an anti-corrosion and acidic neutralization additive for said lube oil or grease.

20. A lube oil or grease containing a minor amount of the product of claim 10 sufficient to act as an anti-corrosion and acidic neutralization additive for said lube oil or grease.

* * * * *